(12) United States Patent
Thomas et al.

(10) Patent No.: US 6,484,619 B1
(45) Date of Patent: Nov. 26, 2002

(54) OBSERVATION OR SIGHTING SYSTEM

(75) Inventors: Pierre Thomas, Verrières-le-Buisson (FR); Jean-Claude Roy, Gif-sur-Yvette (FR); Denis Perthuls, Saint-Jean-de-la-Ruelle (FR)

(73) Assignees: SFIM Industries (FR); Thomson CSF (FR)

( * ) Notice: Subject to any disclaimer, the term of this patent is extended or adjusted under 35 U.S.C. 154(b) by 0 days.

(21) Appl. No.: 09/230,127

(22) PCT Filed: Jul. 23, 1997

(86) PCT No.: PCT/FR97/01373

§ 371 (c)(1),
(2), (4) Date: Jun. 1, 1999

(87) PCT Pub. No.: WO98/03882

PCT Pub. Date: Jan. 29, 1998

(30) Foreign Application Priority Data

Jul. 24, 1996 (FR) ............................................. 96 09290

(51) Int. Cl.⁷ ................................................. F41G 5/06
(52) U.S. Cl. ..................... 89/41.07; 89/41.01; 89/37.01
(58) Field of Search ............................ 89/41.07, 37.01, 89/41.05, 41.09, 41.06, 41.01

(56) References Cited

U.S. PATENT DOCUMENTS

| | | | | |
|---|---|---|---|---|
| 3,946,640 A | * | 3/1976 | Baumann | ................... 89/1.815 |
| 4,393,597 A | * | 7/1983 | Picard et al. | ................... 33/275 |
| 4,616,127 A | * | 10/1986 | Whiting | ....................... 235/412 |
| 4,773,752 A | * | 9/1988 | Bechet et al. | ................... 356/5 |
| 5,197,691 A | * | 3/1993 | Amon et al. | ................ 244/3.13 |
| 5,296,860 A | * | 3/1994 | Li | ................................. 342/58 |
| 5,483,865 A | * | 1/1996 | Brunand | ..................... 89/41.21 |
| 5,680,139 A | * | 10/1997 | Huguenin et al. | ........... 342/175 |
| 5,992,292 A | * | 11/1999 | Ennenga | ..................... 89/41.22 |

\* cited by examiner

*Primary Examiner*—Charles T. Jordan
*Assistant Examiner*—M Thomson
(74) *Attorney, Agent, or Firm*—Blakely Sokoloff Taylor & Zafman

(57) ABSTRACT

An observation or aiming system for a self-propelled vehicle is described. The system includes a post pivoting about a bearing axis (Ag) relative to the vehicle. The post carries a body for an optical block and a thermal camera which are mounted to pivot about an elevation axis (As) perpendicular to the bearing axis (Ag). The body and the thermal camera are disposed symmetrically relative to the bearing axis (Ag). The system also includes a radar channel having a radar transmitter unit mounted on the body, a radar detection unit mounted on the body close to the bearing axis (Ag) and concentration means situated in the body for concentrating radar waves on the radar detection unit. The optical block, the thermal camera, and the radar channel are secured so as to always have the same orientation in elevation and in bearing, and thus the same observation direction.

7 Claims, 1 Drawing Sheet

OBSERVATION OR SIGHTING SYSTEM

FIELD OF THE INVENTION

The present invention relates to observation and aiming systems.

More particularly, it relates to improvements to optoelectronic panoramic observation systems mounted on vehicles, and in particular on combat helicopters.

BACKGROUND OF THE RELATED ART

Systems of this type are already known, in particular gyrostabilized sights and devices for helicopters and for armored vehicles manufactured by one of the Applicant companies.

Conventionally, such a system comprises an optical block for an observation and aiming channel in the visible range (purely optical channel), together with various sensors such as an infrared camera, a television camera, and a laser, in particular for night vision, deviation measuring, range finding, and/or target designation.

The line of sight of those various means is mounted to pivot in elevation and in bearing relative to the structure of the vehicle.

Presently known observation and aiming systems are particularly well adapted to observation, reconnaissance, identification, and also firing, and in general, to most military missions.

Nevertheless, certain military situations can require action to be taken very far ahead of armed forces deep into the enemy disposition.

A mission to penetrate into a zone controlled by the enemy, requires inter alia, the ability to detect random threats that were unknown when preparing for the mission and that can appear while it is in progress.

To succeed with such a mission, both observation and identification, as presently possible using manually-steered optronic means with performance limits that are rapidly reached as a function of conditions of use, are functions that are insufficient. Other functions need to be added to them, such as all-weather watch and detection so as to enable the crew of the vehicle (helicopter, land vehicle, ...) to be able to undertake bypassing and evasive maneuvers early enough to avoid alerting the opponent and carry on with the mission.

Unfortunately, present observation and aiming systems are unsuitable for all-weather watch or detection.

Thus, although infrared detection provides good resolution, its range and contrast are disturbed by humidity and bad weather conditions.

SUMMARY

An aim of the invention is to propose an observation and aiming system enabling that drawback to be mitigated.

The invention provides an observation or aiming system for a vehicle, the system comprising an optical block for observation and/or detection using a channel in the visible range and sensors for night vision and/or deviation measuring and/or range finding and/or target designation, said optical block and said sensors being mounted to pivot about at least one axis relative to the vehicle, the system being characterized in that it further includes means for detection and/or observation in the millimeter wave range, having transmit and receive means situated close to the optical unit and the sensors, and pivoting about at least one axis together with said optical block.

It will be understood that such a system continuously makes available an image in the visible range and an image in the millimeter wave range, both corresponding to the same observation direction—and optionally superposed on same-direction images taken by the sensors, such as a CCD camera covering the visible and the infrared spectrum, and a thermal camera covering the far infrared.

Such a system thus makes it possible to perform analysis over a broad range of wavelengths.

Advantageously, the transmit and receive means in the millimeter wave range are carried by a body in which there are received optical means and which is mounted to pivot about an elevation axis on a post which is itself mounted to pivot relative to the carrier vehicle about a bearing axis.

Such a configuration makes it possible to provide a structure of optimum compactness.

BRIEF DESCRIPTION OF THE DRAWINGS

Other characteristics and advantages of the invention appear from the following description. The description is purely illustrative and non-limiting. It should be read with reference to the accompanying drawing, in which.

DETAILED DESCRIPTION

Figure 1:
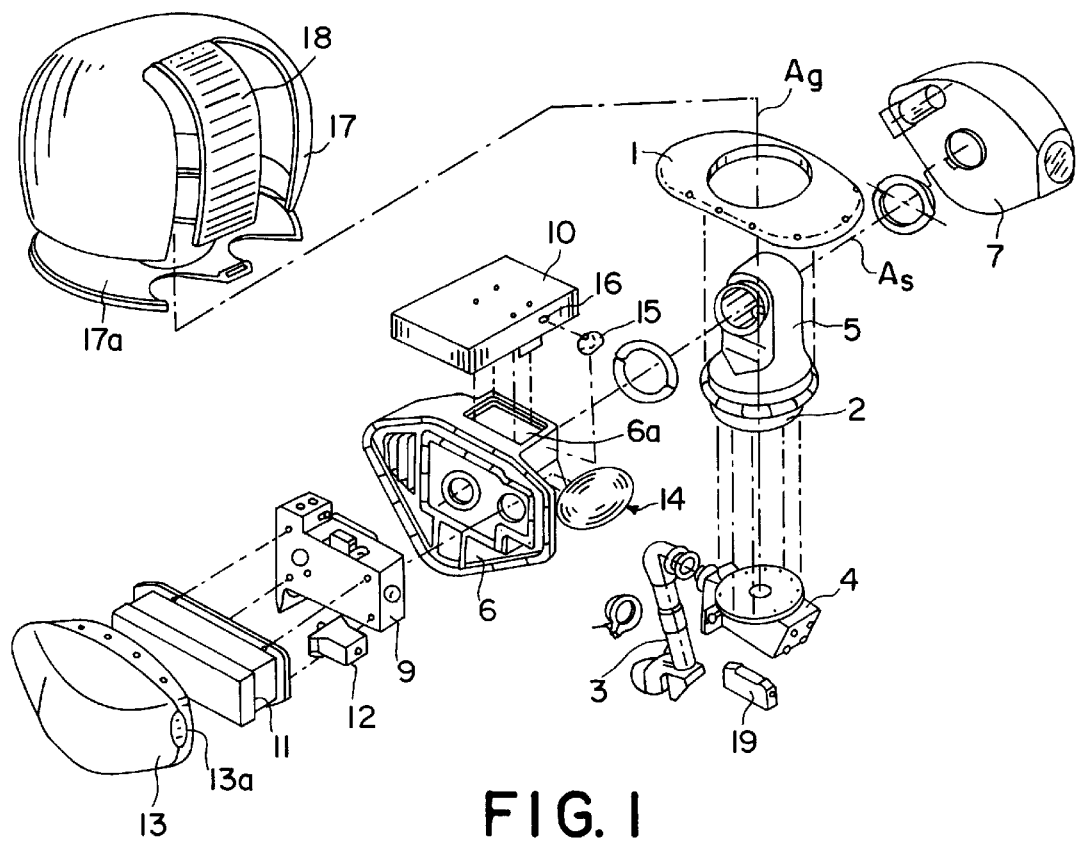
FIG. 1 is an exploded perspective view of a sight constituting a possible embodiment of the invention.
Figure 2:
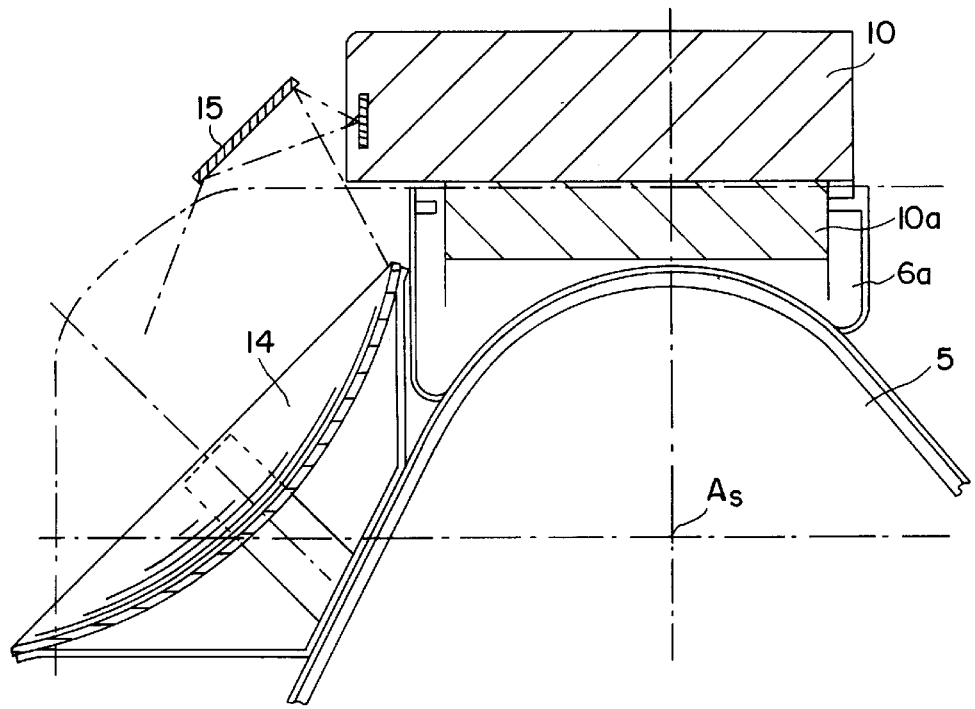
FIG. 2 is a section view of a detail of the FIG. 1 sight.

The gyrostabilized observation and aiming system shown in FIGS. 1 and 2 comprises a structure 1 fixed to the vehicle either directly or via a suspension, together with a base 2 received on the structure 1.

Inside the vehicle, the base 2 carries an optical unit 4 together with a retractable eyepiece arm or telescope 3, of conventional structure.

On the other side of the structure 1, the base 2 carries a post 5 forming a support for the means constituting various observation and detection channels. This post is rotatably received on the base 2 about the relative bearing axis Ag of the system.

The post 5 carries an optical block body 6 and a thermal camera 7 which are disposed in diametrically opposite positions about the axis Ag.

The body 6 and the thermal camera 7 are both mounted to rotate on the post 5 about an axis As which is perpendicular to the axis Ag and which defines the axis of rotation. in elevation for the various observation and detection means of the system.

The body 6 serves as a mechanical support for numerous elements.

In particular, it carries an optical block 9 and a radar detection unit 10.

The radar detection unit 10 is fixed on the body 6 via a leg 10a, of the unit 10. The leg 10a, is received in a complementary housing 6a, in the top face of the body 6.

The optical block 9 is received together with a radar transmitter unit 11 and a television camera 12 fixed on said block 9 in a housing of the body 6 on the elevation axis As.

The optical block 9, the unit 11, and the camera 12 are protected inside the body 6 by a cover 13 fixed on the main body of the body 6.

The cover 13 has at least one porthole 13a, through which the optical block 9 and the camera 12 see the environment of the vehicle.

In an embodiment shown more particularly in FIG. 2, the body 6 also carries an external concave reflector 14 which co-operates with an inclined plane reflector 15 to concentrate millimeter waves reflected from the environment of the vehicle onto a detector 16 of the radar receiver unit 10.

Other millimeter wave concentration methods could be used such as a plurality of reflectors, lenses, and multiple sources, which methods can be used singly or in combination.

The millimeter wave reflector 14 is oriented so that its direction of observation coincides with that of the optical block 9 and with that of the cameras 7 and 12.

The various elements of the above-described system that are situated outside the structure 1 of the vehicle are sheltered within a protector 17 that is fixed via a plate 17a, to the post 5 that is rotatable in bearing relative to the structure 1.

The protector 17 has a radome 18 located in front of the millimeter wave reflector 14 and through which millimeter wave observations are performed. Visible and infrared observations, together with laser rangefinding and/or laser target-designation take place through openings formed in the protector 17 on either side of the radome 18.

With a disposition of the type described above, the observation means in the visible range (purely optical means), in the infrared range, and in the millimeter wave range are situated in the immediate vicinity of one another and always have the same orientation in elevation and bearing.

The various images picked up by these different channels are stabilized and centered on a common direction which is steerable in elevation and in bearing. This orientation direction is known accurately relative to the direction in which the vehicle is pointing and also relative to the direction in which it is moving. These various centered images can have the same field of observation or they can have fields of observation that are different or variable, depending on the functions used: keeping watch, searching, or identification.

Having the optical and millimeter wave sensors sharing a common stabilization support improves knowledge concerning the positions of observed objects compared with using sensors mounted on distinct stabilization supports.

Advantageously, the system also includes means that operate as a function of watch-keeping and/or searching to control automatically and without intervention from the observer the optical means constituting the block 9, the sensors constituting the camera 12 and the thermal camera 7, and the millimeter wave means, so that their common direction of observation scans the environment of the vehicle automatically in elevation and/or bearing, and in particular does so with desired amplitudes and speeds.

In a variant, in order to increase the scanning independence of the millimeter wave means, they are not only caused to move mechanically about the elevation axis and the bearing axis together with the body 6 on which they are fixed in association with the optical block and the sensors, but they also scan the millimeter wave beam electronically in conventional manner. Such scanning can be performed in elevation and/or in bearing relative to a "canonical" position which is the position occupied by the millimeter wave beam when its axis is oriented in the same direction as the optical axes of the optical block and of the sensors.

The images taken by the various channels are used on board the vehicle in such a manner that the weaknesses and limits of one or other of the various channels are compensated by the advantages of the others.

Thus, whereas infrared observation suffers from range and contrast that are severely degraded by humidity, mist, fog, or rain, millimeter waves are insensitive to such conditions. In particular, they penetrate fog, whereas fog is opaque in the infrared.

In addition, the natures of the parameters detected by the infrared and radar apparatuses are different. The infrared device detects natural emission from bodies, i.e. their emissivity, whereas the active radar device is based on the reflectivity thereof. Such reflectivity is particularly high for objects made of metal.

Advantageously, the system includes processing and display means which enable an operator to view either each of the various images from the different channels independently from one another, or else an image that is combined and enriched using the images from the various channels.

In particular, a synthetic image can be presented on a monitor screen 19 situated close to the eyepiece arm 3 or incorporated therein, e.g. by integrating pertinent data coming from the various channels.

The system described above can be used in various modes of operation.

In particular, in a main operating mode, the radar channel and the infrared channel are used in complementary manner to operate in watch-keeping or detection mode.

Also, the radar unit 10 can be used to give access to speed measurements by Doppler analysis or to give access to distance measurements.

The various observation channels may also be used in complementary manner to provide operators inside the vehicle with tactical analysis of the field of operation, or assistance in piloting, in avoiding collision, and in navigation, or indeed in monitoring the weather.

They can also be used to provide assistance in fire control in identification mode, assistance in automatic tracking, in target designation/illumination, or in deviation measuring.

The observation or aiming systems of the invention are advantageously used in combat helicopters and land vehicles.

What is claimed is:

1. An observation or aiming system for a self-propelled vehicle, comprising:
   a post pivoting about a bearing axis (Ag) relative to the vehicle, the post carrying a body for an optical block and a thermal camera which are mounted to pivot about an elevation axis (As) perpendicular to the bearing axis (Ag), wherein the body and the thermal camera are disposed symmetrically relative to the bearing axis (Ag);
   a radar channel including a radar transmitter unit mounted on the body and a radar detection unit mounted on the body close to the bearing axis (Ag); and
   concentration means situated in the body for concentrating radar waves in the millimeter wave range on the radar detection unit including a plurality of reflectors arranged in a particular relationship and an electronic scanning mechanism, and is associated with at least one lens;
   wherein the optical block, the thermal camera, and the radar channel are secured so as to always have the same orientation in elevation and in bearing, and thus the same observation direction.

2. A system according to claim 1, wherein the concentration means comprise a concave reflector and an inclined plane reflector.

3. A system according to claim 1, wherein the concentration means are situated between the optical block and the thermal camera.

4. A system according to claim 3, wherein the system includes a protector which includes a radome covering the concentration means and which also includes openings situated either side of the radome respectively facing the optical block and the thermal camera.

5. A system according to claim 1, wherein the millimeter wave concentration means include one or more lenses optionally associated with one or more reflectors.

6. An observation system according to claim 1, further comprising image processing and display arrangement which is configured to enable an operator to view images provided by the optical block, the thermal camera and the radar channel independently of one another.

7. A system according to claim 1, further comprising means for controlling the orientation of the optical block, the thermal camera and the concentration means so as to cause their common observation direction to scan automatically in at least one of elevation and bearing.

* * * * *

UNITED STATES PATENT AND TRADEMARK OFFICE
CERTIFICATE OF CORRECTION

PATENT NO.    : 6,484,619 B1
DATED         : November 26, 2002
INVENTOR(S)   : Thomas et al.

It is certified that error appears in the above-identified patent and that said Letters Patent is hereby corrected as shown below:

Title page,
Item [86], Filing date, § 371 (c) (1), (2), (4) Date, please delete "Jun. 1, 1999" and insert -- January 22, 1999 --.

Signed and Sealed this

Twenty-seventh Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,484,619 B1
DATED : November 26, 2002
INVENTOR(S) : Thomas et al.

It is certified that error appears in the above-identified patent and that said Letters Patent is hereby corrected as shown below:

<u>Title page,</u>
Item [56], References Cited, U.S. PATENT DOCUMENTS, please insert the following:
-- 3,934,250     01/1976          Martin, Jr.
   4,240,596    12/1980          Winderman et al.
   5,268,680    12/1993          Zantos --.
FOREIGN PATENT DOCUMENTS, please insert the following:
-- GB    GB2053516    02/1981
   EP    EPO362914    04/1990 --.

Signed and Sealed this

Fifth Day of October, 2004

JON W. DUDAS
*Director of the United States Patent and Trademark Office*